United States Patent
Brown et al.

[11] 3,746,942
[45] July 17, 1973

[54] STATIC CIRCUIT ARRANGEMENT

[75] Inventors: Christopher Robert Brown; Terence Malcolm George; David John Norton, all of London, England

[73] Assignee: Westinghouse Brake and Signal Company Limited, London, England

[22] Filed: Oct. 27, 1971

[21] Appl. No.: 192,855

[30] Foreign Application Priority Data
Oct. 29, 1970 Great Britain.................. 51,334/70

[52] U.S. Cl. .......................... 317/148.5 R, 307/253
[51] Int. Cl. ......................................... H03h 17/00
[58] Field of Search............. 317/124, 130, 148.5 R; 250/213 A; 307/253

[56] References Cited
UNITED STATES PATENTS
3,321,631 5/1967 Biard et al. ........................ 317/130
3,418,480 12/1968 Miller ................................ 317/130
3,440,637 4/1969 Molnar et al. .................. 250/213 A
3,519,996 7/1970 Vilkomerson et al. ......... 250/213 A Primary Examiner—L. T. Hix
Attorney—H. A. Williamson, J. B. Sotak et al.

[57] ABSTRACT

This disclosure relates to a static relay having an electronic coil circuit and an electronic contact circuit. The electronic coil circuit includes a pair of d.c. supply terminals and a pair of control terminals. The condition of the electronic contact circuit is controlled in accordance with the electrical state of the control terminals of the electronic coil circuit.

13 Claims, 6 Drawing Figures

Patented July 17, 1973

INVENTORS
Christopher Robert Brown,
Terence Malcolm George &
David John Norton.
BY
John B. Sotak INVENTORS
Christopher Robert Brown,
Terence Malcolm George &
David John Norton.
BY

STATIC CIRCUIT ARRANGEMENT

This invention relates to static relaying circuits and, especially but not exclusively, to such circuit arrangements which are analogous and can be utilized in place of electromechanical relays and which can afford similar features of safety in operation.

More particularly, this invention involves a static relay having a first electronic circuit which simulates the electrical coil of an electromagnetic relay and having at least one second electronic circuit which simulates the switching contacts of the electromagnetic relay. The present static relay may be employed as a replacement for any existing dynamic type of electromagnetic relay since the electronic coil circuit can control an equivalent electronic front contact and an equivalent electronic back contact or any combination of front and back contacts in, for example, an interlocking system.

According to the present invention there is provided a static relaying circuit having supply terminals for the connection to an electrical supply source, control terminals for connection to a modulating device and at least one pair of input and output terminals between which an insulated signal coupler is provided, circuit means energizable from the supply terminals and responsive to at least a predetermined frequency of modulation at the control terminals to produce a significant polarity of intermediate signals to which the insulated signal coupler is responsive to provide coupling between the said input and output terminals.

An insulated signal coupler essentially comprises a component or assembly of components by means of which a signal is transmittable between input and output terminals in complete absence of electrical interconnection between the input and output terminals.

Thus in a preferred manner of putting the invention into practice, the insulated signal coupler may comprise an illumination emitting diode and an illumination responsive semiconductor device so connected that the latter is only subject to illumination to which it is responsive when said significant polarity of signal is applied to the diode.

It is further preferred that a signal transmittable via the insulated signal coupler is a modulated signal such that the signal coupler can constitute a modulating device for connection to the control terminals of a further such static relaying circuit. Alternatively, it may be appreciated that if the static relaying circuit is required to be self-holding, the signal coupler can constitute a static switch for applying modulation to the control terminals of the relaying circuit as a holding control input. An analogy may therefore be observed with electromechanical relays.

By selecting the sense of connection of the insulated signal coupler to receive the intermediate signal the coupler can operate to simulate "front" or "back" relay contacts and accordingly by employing a plurality of such insulated signal couplers, all connected to be controlled by the intermediate signal, a plurality of input and output terminals may be accommodated, thereby simulating a plurality of "front" and/or "back" contacts of an electromechanical relay.

Accordingly, it is an object of this invention to provide an electronic relay circuit which can simulate the front and back contacts of an electromagnetic relay.

Another object of this invention is to provide a fail-safe circuit arrangement which includes a pulsing signal source, an input buffer circuit, an electronic relay and an output buffer circuit.

A further object of this invention is to provide an interlocking circuit employing a plurality of electronic contact devices which are interconnected in such a fashion that a particular condition may be transposed in succession along the electronic contact devices.

Still another object of this invention is to provide a buffer circuit which controls the conductive condition of a light responsive device in accordance with the illuminating condition of a light emitting device.

In order that the invention may be more clearly understood and readily carried into effect, the same will be further described by way of example only with reference to the accompanying drawings in which:

FIG. 3b illustrates the equivalent electronic counterpart of the simple electromechanical relay circuit of FIG. 3a.

Figure 1:
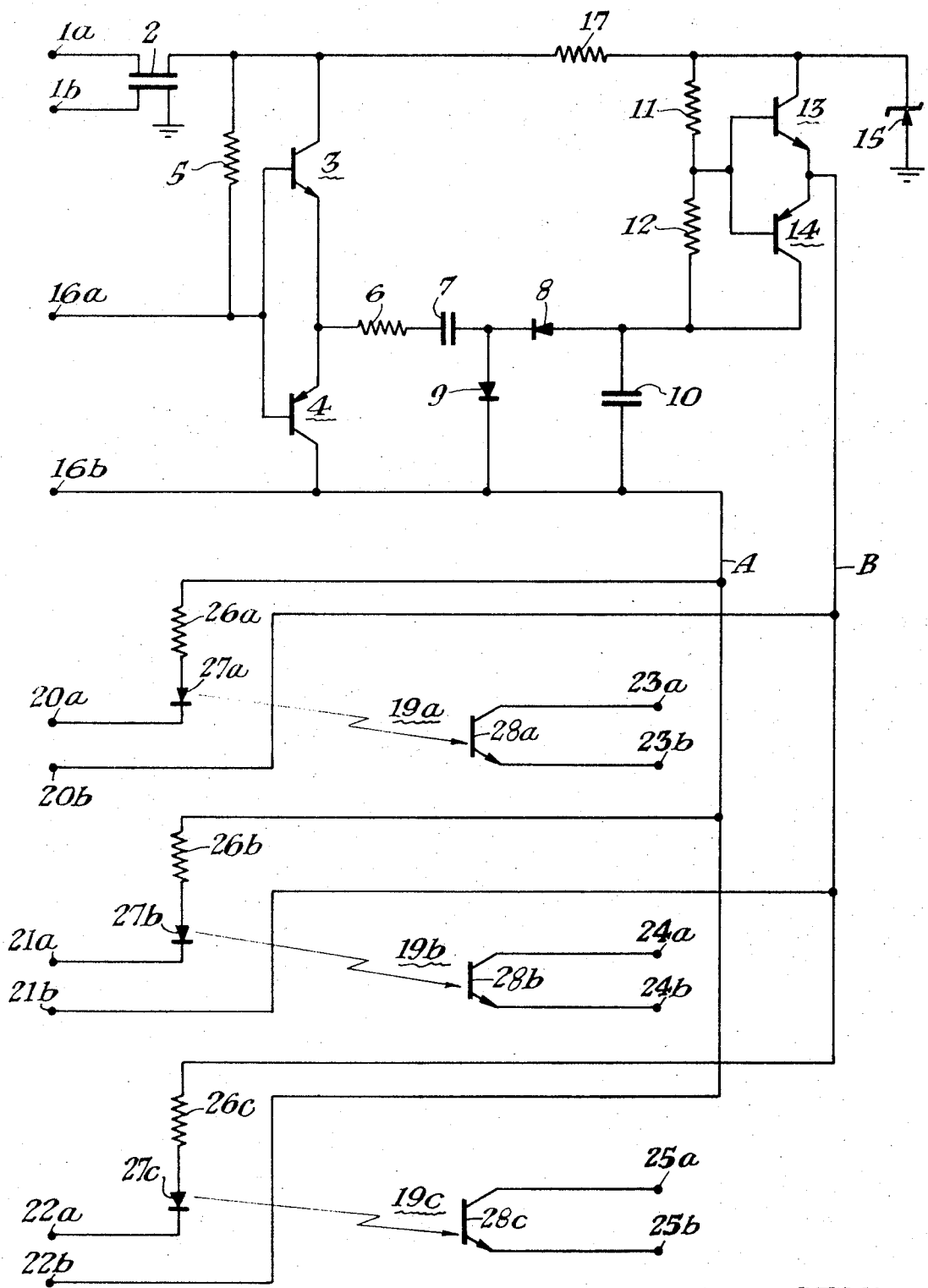
FIG. 1 illustrates a static relaying circuit or static relay in accordance with the invention.

Referring to the drawings and in particular to FIG. 1, the static relay circuit essentially consists of two parts which may be considered as analogous on the one hand to the "coil" of an electromechanical relay and on the other hand to the "switching contacts" of such a relay. The equivalent electronic "coil" circuit portion has a pair of supply terminals denoted by reference numerals 1a and 1b. The terminals 1a and 1b are powered from a suitable d.c. voltage source (not shown) and, in turn, are connected to the upper and lower plates of a four-terminal capacitor 2. One of the remaining two terminals of capacitor 2 supplies positive potential to the electronic "coil" circuit while the other one of the two remaining terminals is connected to ground. The capacitor 2 isolates the supply voltage from any high frequency signals and thereby prevents interaction between the various circuits connected to the same supply source. An input circuit is formed by a pair of complementary transistors 3 and 4. A biasing resistor 5 connects the base electrodes of the NPN transistor 3 and the PNP transistor 4 to the positive terminal of capacitor 2. The transistors 3 and 4 are connected in emitter-follower configuration. The emitter electrodes of transistors 3 and 4 are connected together and feed a diode pump rectifier circuit comprising resistor 6, capacitor 7, diodes 8 and 9, and capacitor 10. The upper plate of capacitor 10 is connected to a potential divider formed by a pair of resistors 11 and 12. The junction point of resistors 11 and 12 is connected to the base electrodes of another pair of complementary transistors 13 and 14 which form an output circuit. The latter transistors are also connected in emitter-follower configuration, and the emitter electrode of NPN transistor 13 is directly connected to the emitter electrode of PNP transistor 14. The emitter electrodes of transistors 13 and 14 form a first intermediate signal point which is denoted by character B. A second intermediate signal point denoted by character A is connected to the lower plate of the capacitor 10. A Zener diode 15 is connected from the collector electrode of the transistor 13 to ground. The Zener diode limits the amount of negative voltage which may be developed on the capacitor 10. A current limiting resistor 17 is connected between the capacitor 2 and the Zener diode 15. The "coil" circuit portion of the circuit is connected to a pair of control input terminals 16a and 16b. The terminal 16a is connected to the common base electrodes of transistors 3 and 4 while the terminal 16b is connected to the collector electrode of transistor 4, the cathode of diode 9, the lower plate of capacitor 10, and the intermediate signal point A.

The electronic "contact" circuit portion of the static relaying circuit is shown to include three (3) insulated signal couplers or photosensitive devices generally characterized by numerals 19a, 19b and 19c. It will be appreciated that the three (3) electronic contact circuits are only illustrative and that a greater or lesser number of electronic contacts may be controlled by the electronic "coil" circuit of the static relay. As shown, the potential developed across terminals A and B is applied in a desired sense to control the coupling between the respective pairs of input and output terminals. In the present instance, the terminals A and B are connected to couplers 19a and 19b in the same manner while the terminals A and B are connected to coupler 19c in the reverse manner. However, it is understood that the connections to the insulated signal couplers are dependent upon their use in a particular application so that alternative connections and other combinations of connections are possible. As shown, each signal coupler is provided with a pair of input terminals as well as a pair of output terminals. The insulated signal couplers 19a, 19b and 19c are provided with input terminals 20a–20b, 21a–21b, and 22a–22b, respectively, and with output terminals 23a–23b, 24a–24b, and 25a–25b, respectively. The first insulated signal coupler 19a comprises a current limiting resistor 26a and an illumination or light emitting diode 27a. The light emitting diode 27a is arranged to cooperate with an illumination responsive semiconductor device 28a, such as, a light responsive transistor. The insulated signal coupler is so constructed that the base of the illumination responsive transistor 28a is only subject to illumination to which it is responsive when a given polarity of an intermediate signal, namely, the voltage across terminals A and B, is applied to the diode to render the diode conducting in the forward direction. For extreme safety, it is preferably desirable to so design the diode 27a that it will not break down in reverse at any voltage which is less than the supply voltage of the "coil" circuit. The two remaining insulated signal couplers 19b and 19c are identical to that formed by resistor 26a, diode 27a and transistor 28a except that the terminals A and B of coupler 19c are reversed, as mentioned above. The coupler 19b includes a current limiting resistor 26b, a light emitting diode 27b and a light responsive transistor 28b, while the coupler 19c includes a current limiting resistor 26c, a light emitting diode 27c, and a light responsive transistor 28c. Like diode 27a, diodes 27b and 27c are designed in such a manner that no breakdown will occur at a voltage that is less than the supply voltage level. With this arrangement the couplers 19a and 19b simulate front contacts while the coupler 19c simulates a back contact, as will be presently described.

In describing the operation of the relaying circuit of FIG. 1, it will be assumed that a d.c. supply voltage is being applied to the terminals 1a and 1b. It is also assumed that a static type of switching circuit is selectively connected as a modulating device across the control terminals 16a and 16b. Let us assume that the static switching circuit is initially opened so that there is no modulating signals on control terminals 16a and 16b. Under this condition the potential at the upper plate of the capacitor 10 is at a positive value. The input circuit formed by transistors 3 and 4 is in a quiescent condition, since no modulation appears on the terminals 16a and 16b. The amount of voltage across capacitor 10 is equal to the sum of the voltage dropped across the diodes 8 and 9 of the diode pump or rectifier circuit. It will be appreciated that the voltage at the terminal B is a somewhat more positive potential than the voltage on the upper plate of capacitor 10. The voltage at terminal B is in fact equal to the voltage at the junction point of resistors 11 and 12, neglecting the voltage drop across the base-emitter junction of transistor 13. Thus, terminal B is more positive than terminal A when the static switching circuit is opened. Hence, the "front" contacts, namely, diodes 27a and 27b are reversely biased and remain dormant while the "back" contact, namely, diode 27c is forwardly biased so that the switching device at terminals 22a and 22b causes pulses of light to be emitted by the diode 27c. The intermittent pulses of light are conveyed to the base electrode of transistor 28c so that it is alternately rendered conductive and nonconductive. That is, a circuit path is complete between the collector and electrodes of transistor 28c when light strikes the base and the circuit path is interrupted when no light impinges on the base. Thus, the conditions on input terminals 22a and 22b are transposed by coupler 19c and will appear on the output terminals. A similar condition exists when the static switching circuit is continuously closed since no modulating pulse will appear across terminals 16a and 16b. That is, the potential on terminal B will be more positive than the potential on terminal A since the equivalent coil circuit is in a quiescent condition, namely, a simulated deenergized condition.

However, if the static switch across control terminals 16a and 16b is operated intermittently at a frequency which is sufficient to operate the diode pump circuit formed of components 6, 7, 8 and 9, the circuit gives rise to a negative potential on the upper plate of capacitor 10 and also on the junction point between resistors 11 and 12. Accordingly, the emitter-follower transistors 13 and 14 give rise to a corresponding negative potential at the terminal B. The circuit parameters may be so designed that in the event of intermittent operation of the static switch across terminals 16a and 16b of sufficient frequency, a negative voltage of, for example, minus (−) 5 volts is present at the terminal B whereas if the switching device across terminals 16a and 16b is continuously closed or continuously open, a voltage of, for example, plus (+) 5 volts is present at the terminal B.

With terminals A and B so connected to the insulated signal couplers and with the presence of intermittent switching at terminals 16a and 16b, the diodes 27a and 27b are forwardly biased and are rendered conductive. Conversely, the diode 27c is reversely biased by the voltage developed across terminals A and B. As will be described hereinafter, an intermittent switching device is connected across terminals 20a and 20b. As mentioned above, this operation can be considered as analogous to "front" contact operation of an electromechanical relay, and the modulation at terminals 16a and 16b is analogous to the "energization" of a relay coil. However, the terminals A and B are connected to insulated signal coupler 19c in the opposite or reverse sense. Thus, the diode 27c is biased in the reverse direction so that the switching device connected across terminals 22a and 22b has no effect on the nonconducting diode 27c. The absence of light causes the transistor 28c to remain nonconducting so that nothing occurs on output terminals 25a and 25b irrespective of the condition on input terminals 22a and 22b. Thus the coupler 19c operates as a "back" contact of an electromagnet since the static relay coil is energized by the modulation on control terminals 16a and 16b.

In the absence of intermittent switching across terminals 16a and 16b, the potential on terminal B will be positive in relation to the potential on terminal A. The lack of a switch condition across control terminals 16a and 16b causes the electronic coil circuit to become deenergized. That is, the absence of modulation causes the emitter-follower transistors 3 and 4 to revert to a quiescent condition so that the upper plate of the capacitor 10 is unable to be changed to a negative potential. In fact, the upper plate of capacitor 10 will become slightly positive, and the positive potential at the junction of resistors 11 and 12 will be conveyed to terminal B via the base-emitter electrodes of transistor 13. With the terminal B more positive than the terminal A, the "front" contact couplers 19a and 19b will be released due to the reverse biasing of diodes 27a and 27b. That is, the nonconduction of the diodes 27a and 27b opens the couplers 19a and 19b so that the condition on terminals 20a-20b and 21a-21b cannot be transposed or conveyed to output terminals 23a-23b and 24a-24b, respectively. The deenergization of the electronic relay "coil" causes the "back" contact coupler 19c to close and allows the condition on input terminals 22a and 22b to be transposed to output terminals 25a and 25b. That is, the diode 27c is forwardly biased by the positive potential on terminal B so that the diode 27c is intermittently illuminated by the intermittent switching operation. Thus, the pulses of light cause opening and closing of the transistor 28c so that the condition on terminals 22a and 22b is transposed to output terminals 25a and 25b.

Thus, the "front" contact couplers 19a and 19b are closed and the "back" contact coupler 19c is opened when the electronic "coil" circuit is energized and vice-versa when the electronic coil circuit is deenergized. Similar operation applies to any other couplers which are employed in the relay circuit. Again, as many input signal couplers may be included as may be required for purposes of the function of the static relaying circuit.

Figure 2:
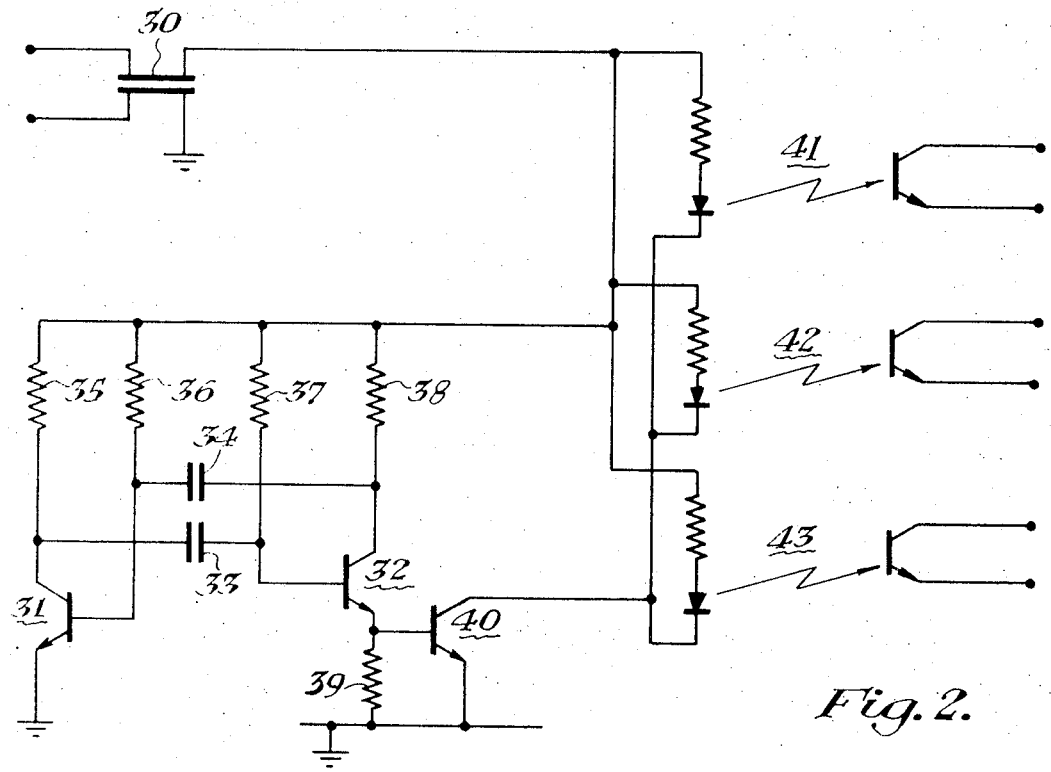
FIG. 2 illustrates a suitable pulsating signal feed circuit or pulse source for use in connection with the relaying circuit of FIG. 1.

From the above description it will be appreciated that in order to function, the relaying circuit must be fed from a suitable feed circuit or pulse source. The feed circuit is used to generate static switching pulsating signals which control input terminals 16a-16b and additionally on the input terminals 20a-20b, 21a-21b, and 22a-22b. A typical such feed circuit is illustrated in FIG. 2 in which a d.c. supply voltage from the same source which supplies capacitor 2 or from a separate source is connected via a four-terminal decoupling capacitor 30 to a relaxation type oscillator in the form of a free-running or astable multivibrator. The multivibrator includes a pair of NPN transistors 31 and 32, coupling capacitors 33 and 34 and resistors 35, 36, 37 and 38 as shown. The multivibrator may be tuned to a typical operating frequency of, for example, 10KHZ. As shown, the emitter electrode of the transistor 32 is connected via a resistor 39 to ground. The emitter electrode of transistor 32 is also directly connected to the electrode of switching or drive transistor 40. The cathode electrode of transistor 40 is connected to the collector of the light emitter diode insulated signal couplers 41, 42 and 43 which are identical to couplers 19a, 19b and 19d. The three diodes are connected in multiple by series connected current limiting resistors. The alternate conducting and nonconducting conditions of transistor 32 intermittently turn the transistor 40 on and off. The turning on of transistor 40 causes the light-emitting diodes to be illuminated. The turning off of transistor 40 causes the diodes to extinguish. Thus, the light emitting diodes are pulsed on and off in phase in accordance with the frequency of the multivibrator. The outputs constitute the collector-emitter circuits of the illumination responsive semiconductor devices or transistors of these couplers. In the arrangement shown, the couplers are three in number but it is apparent that further couplers may be provided and that all of the couplers may be controlled by the transistor 40, if desired. Thus, the feed circuit operates to produce isolated switching by the mutually isolated semiconductor devices of the signal couplers. Furthermore, the switching of these transistors is identically in phase, and it will be appreciated hereafter that such phase coherence is necessary for all "contacts" of relaying circuits included in an interlocking scheme for operating a particular further relaying circuit.

Figure 3A:
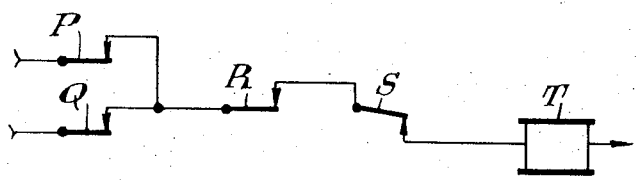
FIG. 3a illustrates diagrammatically the switching contacts of a simple electromechanical relay circuit.

Referring now to FIG. 3a, there is illustrated a typical simple relay interlocking circuit whereby the coil of relay T can only be energized under certain conditions, namely, the contacts of the relays P, Q, R, and S must provide a closed path for the relay coil T. The front contact of relay P or the front contact of relay Q must be closed and the front contact of relay R and the back contact of relay S must be closed. This condition only exists when either relay P or relay Q is energized and relay R is energized and relay S is deenergized.

Figure 3B:
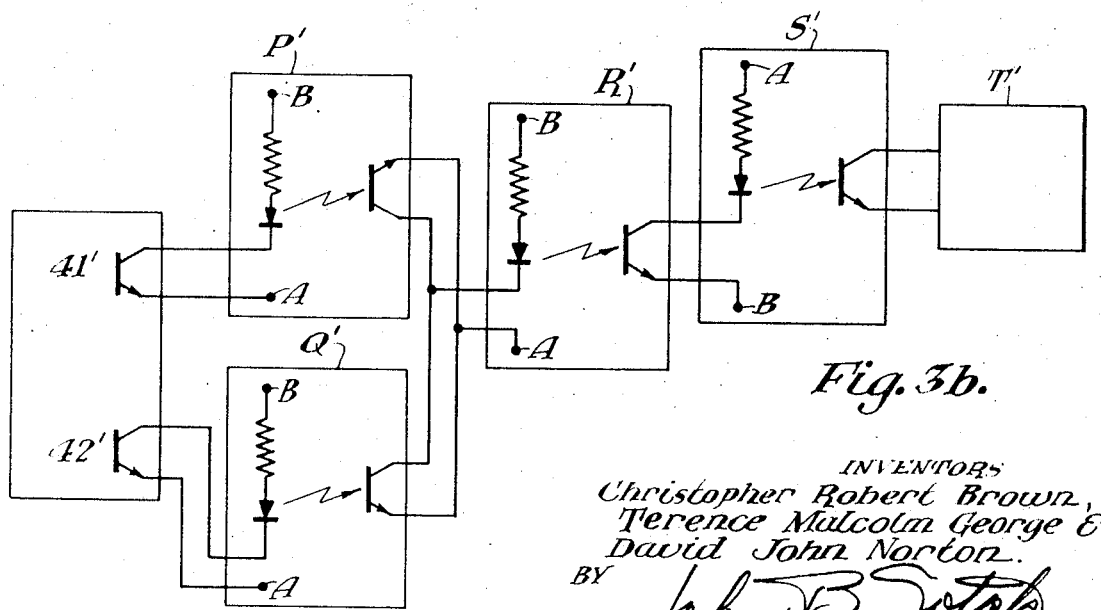

FIG. 3b illustrates the analogous interlocking scheme employing "contacts" of a static relaying circuit such as the one described above with reference to FIG. 1.

It will be understood that each of the contacts of the electromagnetic relays P, Q, R, S and T is replaced by a static relaying circuit, such as, described above with reference to FIG. 1. For the relevant contacts of relays P, Q, R and S there will be allocated insulated signal couplers which are appropriately connected to intermediate terminals A and B, such as, those in FIG. 1, to make these couplers analogous to the front or back contacts of the relays. The relevant signal couplers are shown in FIG. 3b. The output terminals of the "back contact" of the relaying circuit S' are connected to the control input terminals such as to terminals 16a and 16b of FIG. 1 of the "coil" portion of the static relaying circuit T'. The inputs to the "front contacts" of the relaying circuits P' and Q' are connected to the emitter-collectors of a pair of light responsive transistors of the isolated insulated signal couplers of a single feed unit of the type shown in FIG. 2. Accordingly, co-phasal operation of the contact portion of each of the relays in the interlocking scheme illustrated is guaranteed. It will be understood here that the "coil" portions of the static relaying circuits P', Q', R', and S' may be controlled at their control inputs by the presence or absence of pulsating signals which bear no phase relationship with the pulsating of the feed unit which supplies the coil portion of relay T' over the relevant contacts of P', Q', R', and S' stipulated in FIG. 3b.

It will be understood that the static relaying circuit T' may be required to hold over its own "contacts." To accomplish this, a "front contact" portion of the circuit has its output terminals connected in series with a further feed circuit output such as that associated with the isolator 43 of the feed circuit of FIG. 2 and the control terminals of the "coil" portion of the relay T'. The multivibrator switching frequency is therefore continuously applied following operation of circuit T', back to the "coil" portion and "holds" the static relaying circuit T' energized.

Figure 4:
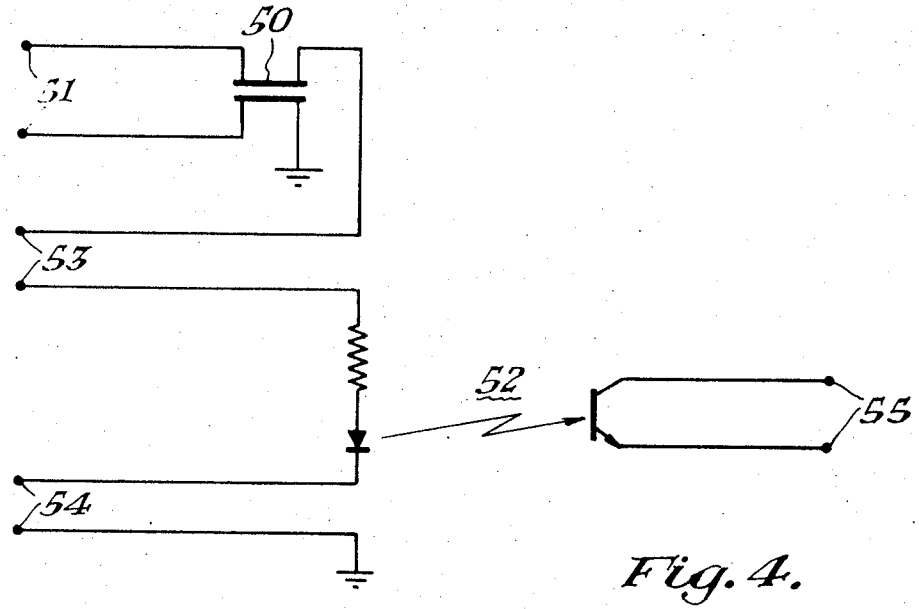
FIG. 4 illustrates an input buffer circuit.

Reference may now be made to FIG. 4 which illustrates a simple form of input buffer circuit. The buffer circuit includes a d.c. supply source, a series connecting switch, a transfer switch and an isolating coupler having a light emitting device and a light responsive device. The buffer circuit enables a pulsating "input" to be applied to a static relaying circuit in accordance with the opening and closing of manually operated electrical contacts. Typically, the electrical contacts may be actuated by a manually operated pushbutton switch, or the like. The buffer circuit includes a four-terminal isolating capacitor 50 which is connected to a pair of d.c. supply terminals 51. Like the previously described couplers, the insulated signal coupler 52 essentially consists of an illumination producing diode and an illumination responsive semiconductor device. The electrical contacts of the pushbutton switch are connected to terminals 53. The output, such as, the emitter-collector electrodes of, for example, one of the insulated couplers of the pulsating feed circuit of FIG. 2, is connected to terminals 54. Thus, when the terminals 53 are closed by the manual switch and when a pulsating switching function is applied across terminals 54 by a static switch, the coupler 52 is operated to provide a pulsating switching function across the emitter-collector electrodes of the semiconductor device at terminals 55. Output terminals 55 can therefore be connected in an interlocking circuit, such as, previously described, so that a pulsating switching function is produced across terminals 55 only when the switch across terminals 53 is closed.

Figure 5:
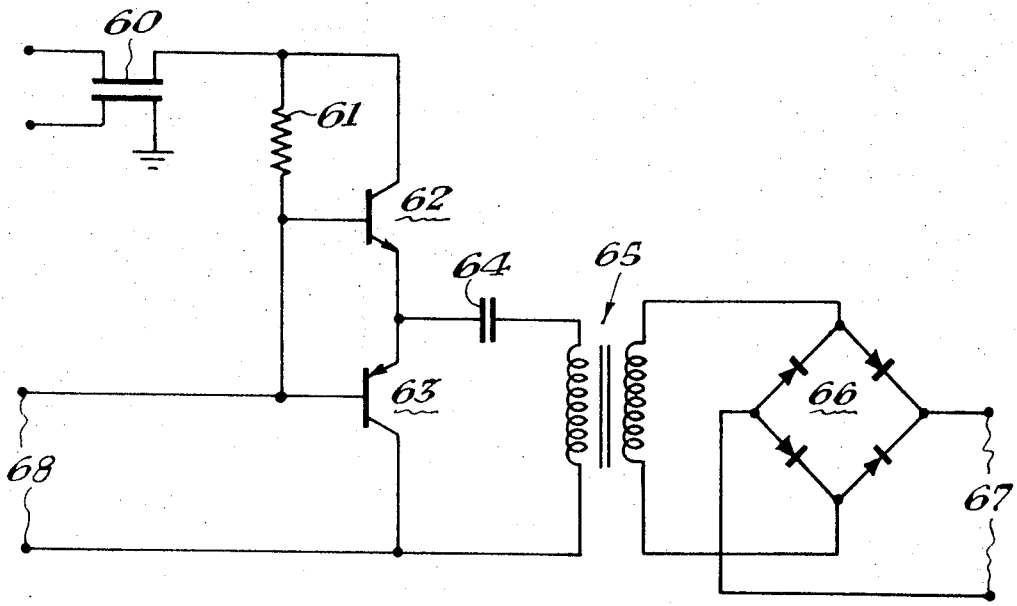
FIG. 5 illustrates an output buffer circuit.

FIG. 5 illustrates a suitable form of output buffer circuit which may be used in conjunction with the present invention. The output buffer circuit can accept a pulsating switching function to produce a d.c. output voltage of fixed polarity. The d.c. output voltage may be employed to energize an external utilization device, such as, a relay, a lamp, or an alarm. Again, the circuit of FIG. 5 includes a four-terminal capacitor 60 which has two terminals of its four terminals connected to a suitable d.c. supply source. The other two terminals of the capacitor 60 are connected to a pair of complementary transistors 62 and 63. The two transistors are connected in emitter-follower fashion. The input base electrodes are connected together and in turn are connected to the upper plate of capacitor 60 via resistor 61. The emitter electrodes of the two transistors are connected together and in turn are connected by a coupling capacitor 65 to the primary winding of a transformer 65. The secondary winding of transformer 65 is coupled via a bridge rectifier 66 to output terminals 67. Thus, a d.c. voltage potential is developed across terminals 67 when a pulsating switching function appears across terminals 68.

Although specific embodiments of the invention have been described herein for the purpose of illustrating our invention, it will be understood that various changes, modifications and equivalent circuit arrangements may be employed other than those specifically mentioned herein without departing from the scope of the invention as set forth in the appended claims.

Having thus described our invention, what we claim is:

1. A fail-safe solid state relay circuit having
   a. an energizable electronic coil equivalent circuit which has a controlled signal input,
      said energizable electronic coil equivalent circuit having a conditioned output that is in one of two conditions controlled by said controlled signal input,
   b. an electronic equivalent contact circuit controlled by said energizable electronic coil equivalent circuit output and having a signal input and output,
      said equivalent contact circuit allowing a signal directly proportional to said input signal to appear on said output only when said conditioned output is in a selected one of said two conditions.

2. A fail-safe circuit arrangement comprising, first circuit means for producing pulsating signals, second circuit means having its input circuit coupled to said first circuit means and responsive to pulsating signals for opening and closing its output circuit, an electronic relay means connected to said output circuit of said second circuit means and having its coil circuit controlling the condition of its contact circuit, and a third circuit means connected to said contact circuit of said electronic relay means for controlling the conductive condition of an output device.

3. A fail-safe circuit arrangement as defined in claim 2, wherein each of said first circuit means, said second circuit means and said electronic relay means includes a light emitting device and a light responsive device.

4. A fail-safe circuit arrangement as defined in claim 2, wherein said first circuit means is a free-running oscillator.

5. A fail-safe circuit arrangement as defined in claim 2, wherein said third circuit means is an amplifier-rectifier network.

6. A fail-safe circuit arrangement as defined in claim 2, wherein said electronic relay means includes a semiconductive coil circuit and a photosensitive contact circuit.

7. A fail-safe circuit arrangement as defined in claim 6, wherein said photosensitive contact circuit includes a light emitting device and a light responsive device.

8. A fail-safe interlocking circuit comprising, a plurality of electronic contact devices each having an input and an output circuit, said output circuit of one of said plurality of said electronic contact devices cooperatively associated with said input circuit of a succeeding one of said plurality of said electronic contact devices so that the condition on said input circuit of said one of said plurality of said electronic contact devices is transposed to said output circuit of said succeeding one of said plurality of said electronic contact devices.

9. The interlocking circuit as defined in claim 8, wherein said plurality of said electronic contact devices include front and back contacts.

10. The interlocking circuit as defined in claim 8, wherein the input circuit of said electronic contact devices includes a light emitting device and said output circuit of said electronic contact devices includes a light responsive device.

11. The interlocking circuit as defined in claim 10, wherein said light emitting device is a diode which may be forwardly biased to form a front contact and which may be reversely biased to form a back contact.

12. The interlocking circuit as defined in claim 10, wherein said light responsive device is a transistor.

13. A fail-safe circuit arrangement comprising, a d.c. supply source, a connecting switch coupled to said d.c. supply source, a light emitting device coupled to said connecting switch and forwardly biased by the closing of said connecting switch, a transfer switch coupled to said light emitting device for controlling the illuminating condition of said light emitting device, and a light responsive device cooperatively associated with said light emitting device so that the conductive condition of said light responsive device is controlled in accordance with the illuminating condition of said light emitting device.

* * * * *